(12) United States Patent
Yanagimoto et al.

(10) Patent No.: US 11,798,724 B2
(45) Date of Patent: Oct. 24, 2023

(54) CORE

(71) Applicant: Panasonic Intellectual Property Management Co., Ltd., Osaka (JP)

(72) Inventors: Shana Yanagimoto, Kanagawa (JP); Kento Mochizuki, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 523 days.

(21) Appl. No.: 16/906,738

(22) Filed: Jun. 19, 2020

(65) Prior Publication Data

US 2020/0402696 A1 Dec. 24, 2020

(30) Foreign Application Priority Data

Jun. 21, 2019 (JP) ................................ 2019-115485

(51) Int. Cl.
*H01F 27/24* (2006.01)
*H01F 27/08* (2006.01)
*H01F 27/32* (2006.01)

(52) U.S. Cl.
CPC ............. *H01F 27/24* (2013.01); *H01F 27/08* (2013.01); *H01F 27/327* (2013.01)

(58) Field of Classification Search
CPC ........ H01F 27/24; H01F 27/08; H01F 27/327; H01F 27/263; H01F 3/00; H01F 2003/005; H01F 3/10; H01F 3/12; H01F 3/14

See application file for complete search history.

(56) References Cited

U.S. PATENT DOCUMENTS

| | | | | |
|---|---|---|---|---|
| 3,851,287 A | * | 11/1974 | Miller | H01F 27/36 336/84 R |
| 5,955,934 A | * | 9/1999 | Raj | H01F 7/088 335/229 |
| 6,392,519 B1 | * | 5/2002 | Ronning | H01F 27/025 336/61 |
| 6,954,131 B2 | * | 10/2005 | DuVal | H01F 29/02 336/212 |
| 2003/0001714 A1 | * | 1/2003 | Colby | H01F 27/245 336/234 |
| 2004/0085173 A1 | | 5/2004 | Decristofaro et al. | |
| 2004/0085174 A1 | | 5/2004 | Decristofaro et al. | |
| 2006/0066433 A1 | * | 3/2006 | Decristofaro | H01F 41/0226 336/212 |

(Continued)

FOREIGN PATENT DOCUMENTS

DE 19627817 A1 1/1998
DE 10139446 A1 2/2003

(Continued)

OTHER PUBLICATIONS

English Translation of German Office Action, dated Sep. 5, 2022, for German Patent Application No. 10 2020 116 282.0. (6 pages).

(Continued)

*Primary Examiner* — Mang Tin Bik Lian
(74) *Attorney, Agent, or Firm* — Seed IP Law Group LLP

(57) ABSTRACT

A core includes a winding part, and a wall part including a first wall part, a second wall part spaced apart from the first wall part and disposed opposite to the first wall part, a third wall part in contact the first wall part, and a fourth wall part disposed opposite to the third wall part. The wall part surrounds the winding part.

7 Claims, 6 Drawing Sheets

(56) References Cited

U.S. PATENT DOCUMENTS

| | | | | |
|---|---|---|---|---|
| 2007/0046415 | A1* | 3/2007 | Wadlington | H01F 30/12 336/212 |
| 2008/0093966 | A1* | 4/2008 | Li | H01F 38/10 335/297 |
| 2010/0194512 | A1* | 8/2010 | Pieteris | H01F 37/00 336/110 |
| 2012/0169443 | A1* | 7/2012 | Takiguchi | H01F 27/22 336/61 |
| 2012/0293290 | A1* | 11/2012 | Kido | H01F 27/10 336/60 |
| 2013/0093553 | A1 | 4/2013 | Moiseev et al. | |
| 2014/0266537 | A1* | 9/2014 | Bichler | H01F 27/24 336/178 |
| 2016/0049238 | A1* | 2/2016 | Young | H01F 27/325 336/208 |
| 2016/0189847 | A1* | 6/2016 | Willis | H01F 27/263 336/212 |
| 2016/0307684 | A1 | 10/2016 | Takiguchi et al. | |
| 2017/0011830 | A1* | 1/2017 | Lu | H02M 3/1584 |

FOREIGN PATENT DOCUMENTS

| | | |
|---|---|---|
| DE | 10152867 A1 | 5/2003 |
| EP | 3330980 A1 | 6/2018 |
| JP | H05109551 A | 4/1993 |
| JP | H05159936 A | 6/1993 |
| JP | H0935965 A | 2/1997 |
| JP | 2003217945 A | 7/2003 |
| JP | 2006505143 A | 2/2006 |
| JP | 2007073903 A | 3/2007 |
| JP | 2012238743 A | 12/2012 |
| JP | 2013089774 A | 5/2013 |
| JP | 2014-143439 A | 8/2014 |
| JP | 2015141918 A | 8/2015 |
| JP | 2016025273 A | 2/2016 |
| JP | 2016058690 A | 4/2016 |

OTHER PUBLICATIONS

English Translation of Japanese Office Action, dated Jan. 4, 2023, for Japanese Patent Application No. 2019-115485. (4 pages).

* cited by examiner

CORE

TECHNICAL FIELD

The present disclosure relates to a core.

BACKGROUND ART

In the related art, a technique in which a combination of two E-shaped or U-shaped cores is used in a transformer provided in a power conversion apparatus or the like is commonly known. For example, in the case of the E-shaped cores, each core includes a main body part extending in a predetermined direction and three legs extending in a direction perpendicular to the predetermined direction from the main body part, and two cores are used in a transformer in the state where the legs of the two cores are opposite to one another.

For example, a configuration in which an E-shaped core and an I-shaped core are coupled is known as a related art. In this configuration, each component is fixed so as to maintain the relative positions. In addition, in the case where a gap is provided between each leg of each core of the transformer, E-shaped cores are typically used for the purpose of accurately setting the gap length.

CITATION LIST

Patent Literature

PTL 1
Japanese Patent Application Laid-Open No. 2014-143439

SUMMARY OF INVENTION

Technical Problem

Since heat is generated during operation of the apparatus, the above-mentioned core is cooled by a cooling part provided in the apparatus; however, since it is difficult to uniformly cool the entirety of the core, a temperature gradient occurs between a portion cooled by the cooling part and other portions. As a result, a stress is applied to the core due to heat generation in the core, and consequently the loss of the core is increased. As the loss of the core increases, the loss further increases the temperature gradient, and the loss of the core further increases.

In addition, in the case of the core having a plurality of legs such as the E-shaped core, when the temperature gradient is further increased and the stress is further applied between the legs, the core may be damaged by the stress. In particular, in the configuration in which the components are fixed so as to maintain the relative positions as in the configuration of the related art, the contact points of the components are completely fixed, and consequently the portions other than the contact points may be damaged.

An object of the present disclosure is to provide a core that can reduce an increase of the heat generation amount and an increase of the loss due to a stress applied to the core.

Solution to Problem

A core according to an embodiment of the present disclosure includes a winding part where a winding is wound; and a wall part including a first wall part, a second wall part spaced apart from the first wall part and disposed opposite to the first wall part in a first direction, a third wall part in contact with the first wall part, and a fourth wall part spaced apart from the third wall part and disposed opposite to the third wall part in a second direction different from the first direction, the wall part surrounding the winding part.

Advantageous Effects of Invention

According to the present disclosure, it is possible to provide a core that can reduce an increase of the heat generation amount and an increase of the loss due to a stress applied to the core.

DESCRIPTION OF EMBODIMENTS

Figure 1:
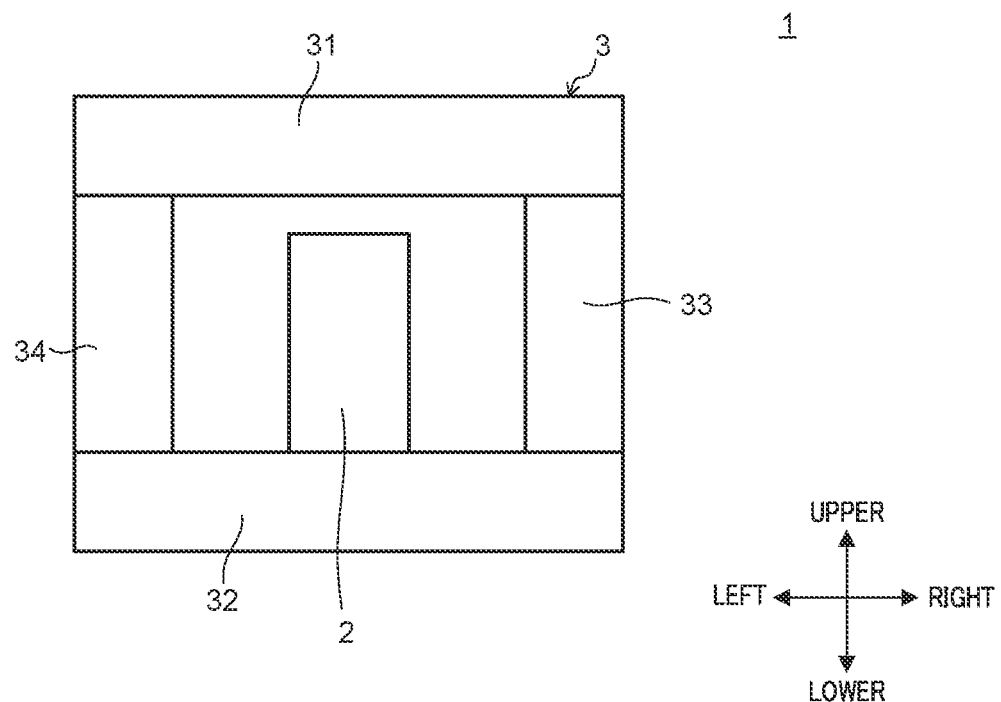
FIG. 1 is a diagram illustrating a core according to an embodiment of the present disclosure.

An embodiment of the present disclosure will be described in detail below with reference to the drawings. FIG. 1 is a diagram illustrating core 1 according to an embodiment of the present disclosure.

As illustrated in FIG. 1, core 1 is, for example, a magnetic material such as an iron core used in a transformer provided in a power conversion apparatus such as a power supply apparatus, and core 1 includes winding part 2 and wall part 3. Winding part 2 and wall part 3 are composed of respective members that are separate from each other. Here, the separate members are members that are each independently composed, and are not integrated with each other, and the separate members are not necessarily be composed of different materials.

Winding part 2 is a part where a winding (not illustrated) is wound, and extends in the vertical direction. The vertical direction corresponds to the "first direction" of the present disclosure.

The end surface of the lower end portion of winding part 2 is in contact with the upper surface of second wall part 32 (described later) in wall part 3. The upper end portion of winding part 2 is disposed apart from the lower surface of first wall part 31 (described later) in wall part 3.

Wall part 3 surrounds winding part 2 and has a rectangular shape. Wall 3 includes first wall part 31, second wall part 32, third wall part 33 and fourth wall part 34. First wall part 31, second wall part 32, third wall part 33 and fourth wall part 34 are composed of respective plate-shaped members that are separate members.

First wall part 31 and second wall part 32 are extended in the lateral direction and disposed so as to sandwich winding part 2 in the vertical direction. The lateral direction corresponds to the "second direction" of the present disclosure.

First wall part 31 is disposed on the upper end side of winding part 2. Second wall part 32 is disposed on the lower end side of winding part 2.

Third wall part 33 and fourth wall part 34 are extended in the vertical direction and disposed so as to sandwich winding part 2 in the lateral direction. Third wall part 33 and fourth wall part 34 are disposed between first wall part 31 and second wall part 32 in the vertical direction.

Third wall part 33 is disposed on the right side of winding part 2, and fourth wall part 34 is disposed on the left side of winding part 2.

The end surface of the upper end portion of third wall part 33 is in contact with the lower surface of the right end portion of first wall part 31. The end surface of the lower end portion of third wall part 33 is in contact with the upper surface of the right end portion of second wall part 32.

The end surface of the upper end portion of fourth wall part 34 is in contact with the lower surface of the left end portion of first wall part 31. The end surface of the lower end portion of fourth wall part 34 is in contact with the upper surface of the left end portion of second wall part 32.

Figure 2:
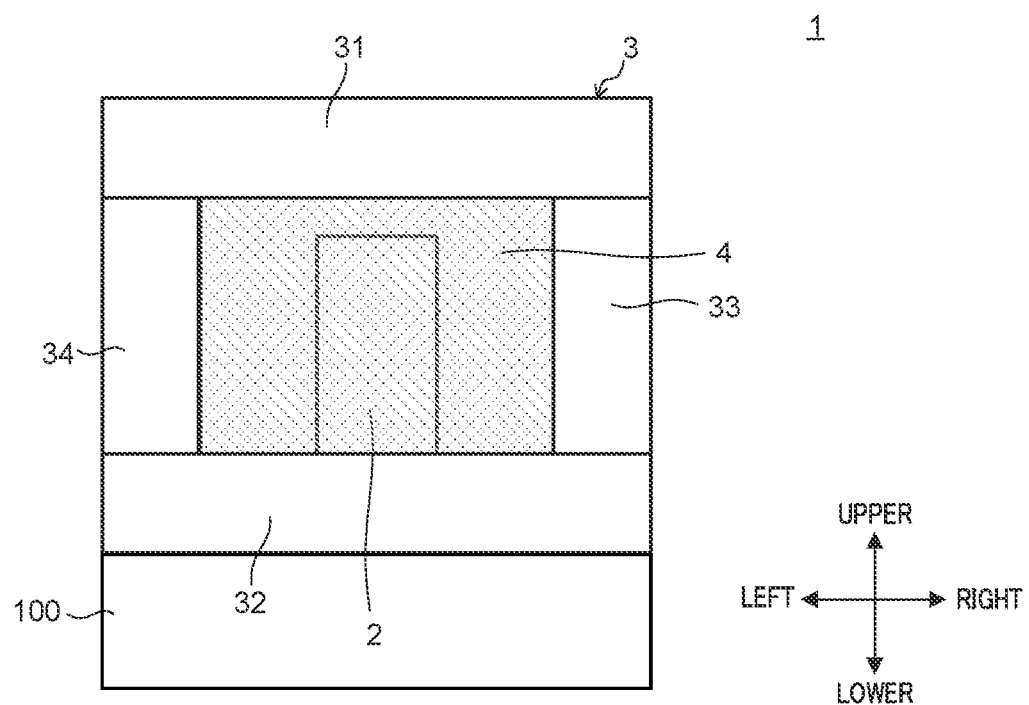
FIG. 2 is a diagram illustrating a state where the core is filled with a potting material.

In addition, as illustrated in FIG. 2, winding part 2 and wall part 3 are fixed with potting material 4. Potting material 4 is provided inside wall part 3 together with winding part 2 and the winding.

In addition, second wall part 32 is a part that makes contact with a cooling part 100 provided in an external apparatus such as a power conversion apparatus. In other words, second wall part 32 is a portion to be cooled by the external cooling part. In addition, the end portion of winding part 2 located on the side of the portion to be cooled is disposed in contact with wall part 3, and the end portion of winding part 2 that is opposite to the portion to be cooled is spaced apart from wall part 3.

An effect and an operation of core 1 according to the present embodiment having the above-described configuration are described below.

Core 1 generates heat during operation of the apparatus in which core 1 is mounted. In the present embodiment, since second wall part 32 is a portion to be cooled, core 1 is cooled when the portion of second wall part 32 is cooled. However, since the portions other than second wall part 32 in core 1 are not in contact with the cooling part, the entire core 1 is not uniformly cooled. Therefore, a temperature gradient occurs between second wall part 32 and the other portions.

Figure 3:
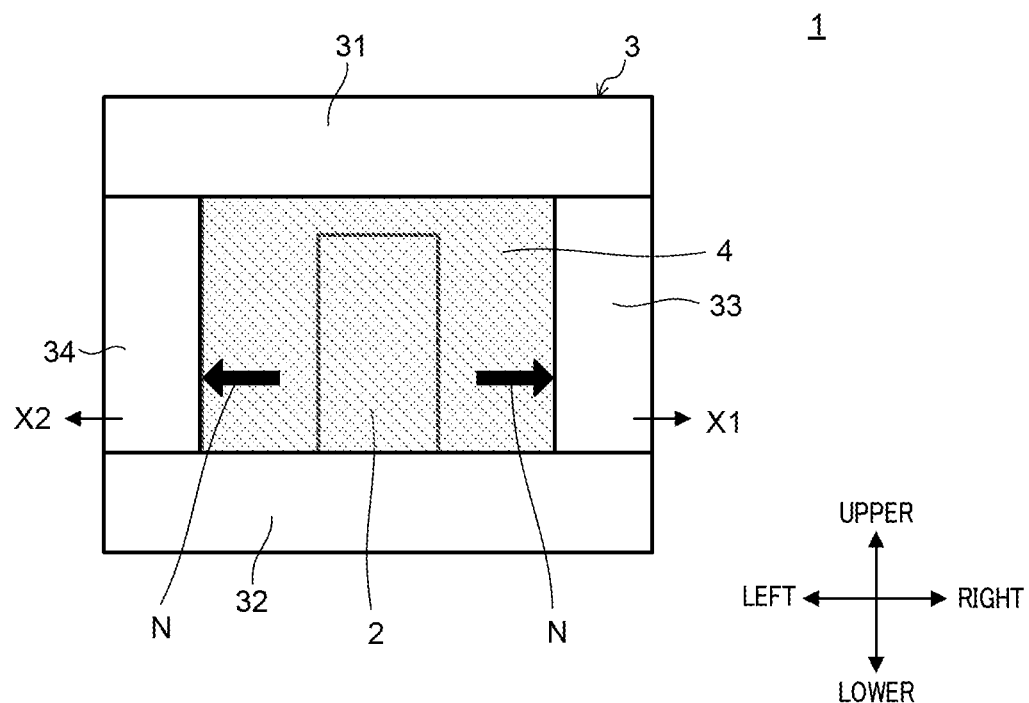
FIG. 3 is a diagram for explaining an effect and an operation of the core.

When such a temperature gradient occurs, a stress is applied to each part of core 1 due to the thermal expansion of the potting material 4. In addition, a stress is applied to each part of core 1 also due to the thermal expansion of wall part 3 itself. For example, as illustrated in FIG. 3, in third wall part 33 and fourth wall part 34, outward stress N is applied from the inside of wall part 3. In FIG. 3, only the stress N applied to third wall part 33 and fourth wall part 34 is illustrated as an example, and illustration of the stress applied to first wall part 31 and second wall part 32 is omitted.

Such a stress N affects the magnetic field generated by the winding, and the loss in core 1 increases. When the loss of core 1 increases, the heat generation amount increases as a result of the loss, and accordingly the temperature gradient further increases. Then, the stress further increases, and consequently the loss of core 1 further increases.

Figure 4:
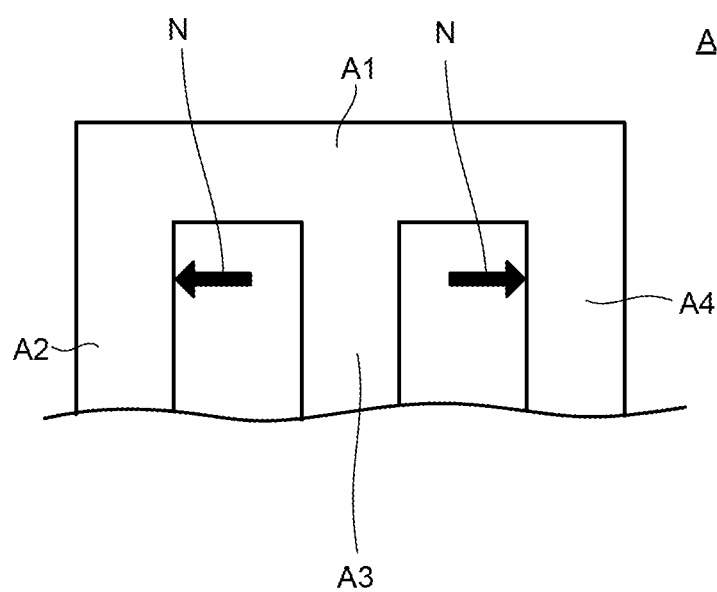
FIG. 4 is a diagram for explaining a problem with an E-shaped core.

Here, for example, in the case of a configuration including an E-shaped core A including main body part A1 and three leg parts A2, A3, and A4 extending in the vertical direction from different portions of main body part A1 as illustrated in FIG. 4, a stress N is applied between main body part A1 and each leg part and/or between two different leg parts.

Disadvantageously, such a configuration continuously increases the heat generation amount, the stress, and the loss, eventually breaking core A.

In contrast, in the present embodiment, the parts in wall part 3 are separate members as illustrated in FIG. 3. In other words, first wall part 31, second wall part 32, third wall part 33 and fourth wall part 34 are configured to be movable with thermal expansion of wall part 3.

Thus, each part slides along the direction of the stress applied to the part (see arrows X1 and X2), and each part can relieve the stress applied to each other. As a result, the influence of the stress can be reduced, and the increase of the heat generation amount and the increase of the loss due to the stress can be reduced.

In addition, since winding part 2 is composed of a member separate from wall part 3, the parts of wall part 3 and winding part 2 slide in the direction of the stress applied thereto, and the stress can be relieved. As a result, the influence of the stress can be reduced, and thus, a further increase of the heat generation amount and a further increase of the loss due to the stress can be reduced.

In addition, by reducing the increase of the heat generation amount and the increase of the loss, the increase of the stress due them can be suppressed, and thus a situation where core 1 is damaged by the increase of the stress can be suppressed.

In addition, since second wall part 32 is the portion to be cooled, the spacing between winding part 2 and first wall part 31 is located on the side opposite the cooling part. When winding part 2 and first wall part 31 are in contact with each other, the heat generated in winding part 2 is transmitted to first wall part 31. Since first wall part 31 is located on the side opposite to second wall part 32 that is the portion to be cooled, first wall part 31 is difficult to be cooled. As such, when first wall part 31 is in contact with winding part 2, the cooling efficiency of the entire core 1 is reduced.

In contrast, in the present embodiment with the spacing between winding part 2 and first wall part 31, the heat generated in winding part 2 is not easily transmitted to first wall part 31. As a result, reduction in the cooling efficiency of the entire core 1 is suppressed, and thus the cooling performance in core 1 is improved.

In addition, since winding part 2 and wall part 3 are fixed with potting material 4, winding part 2 and wall part 3 can be easily fixed. In addition, since the winding is also fixed with the potting material 4, it is not necessary to provide a bobbin and the like, for example. As a result, the number of parts in core 1 can be reduced.

Figure 5:
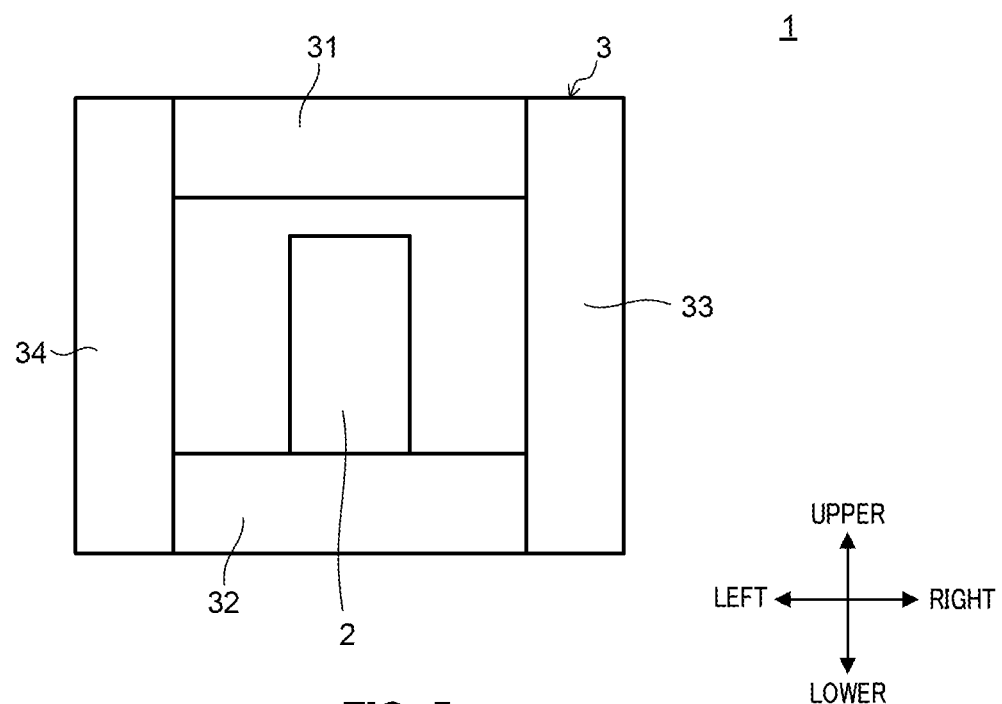
FIG. 5 is a diagram illustrating an example of a core according to a modification.

While third wall part 33 is in contact with the lower surface of first wall part 31 and the upper surface of second wall part 32 in the above embodiment, the present disclosure is not limited thereto. For example, as illustrated in FIG. 5, third wall part 33 may be in contact with the end surface of the right end portion and the end surface of the right end portion of second wall part 32.

In addition, while fourth wall part 34 is in contact with the lower surface of first wall part 31 and the upper surface of second wall part 32 in the above embodiment, the present disclosure is not limited thereto. For example, as illustrated in FIG. 5, fourth wall part 34 may be in contact with the end surface of the left end portion of first wall part 31 and the end surface of the left end portion of second wall part 32.

Figure 6:
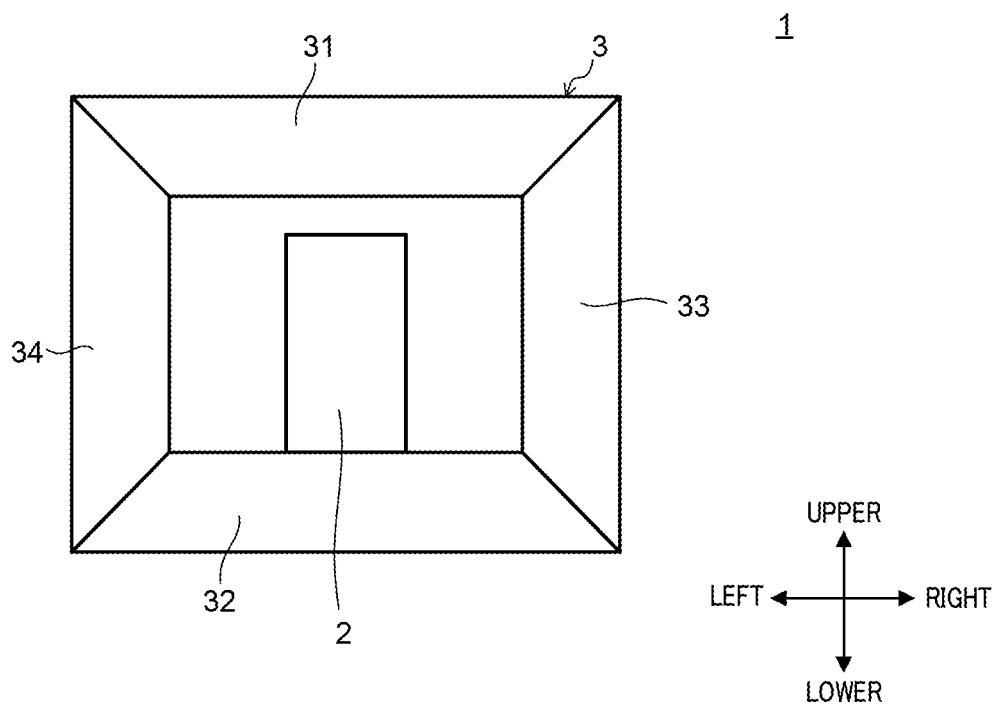
FIG. 6 is a diagram illustrating an example of a core according to a modification.

In addition, while the surface shape of each of first wall part 31, second wall part 32, third wall part 33 and fourth wall part 34 is a rectangular shape in the above embodiment, the present disclosure is not limited thereto. For example, as illustrated in FIG. 6, the surface shape of each of first wall part 31, second wall part 32, third wall part 33 and fourth wall part 34 may be a trapezoidal shape.

Figure 7:
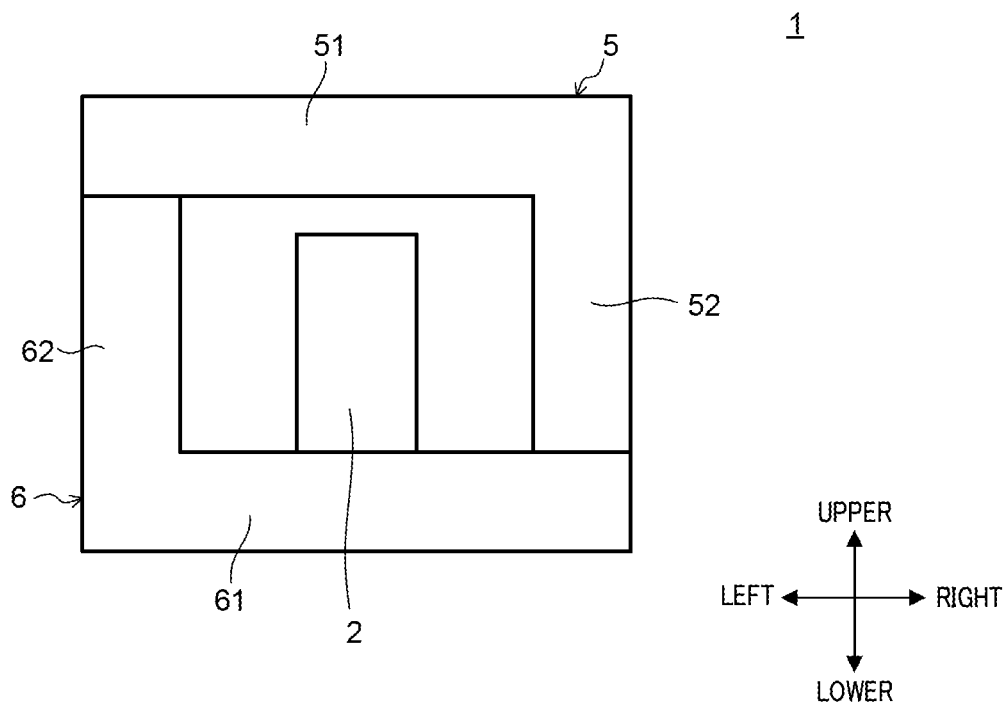
FIG. 7 is a diagram illustrating an example of a core according to a modification.

In addition, while wall part 3 is divided into four parts, namely, first wall part 31, second wall part 32, third wall part 33 and fourth wall part 34 in the above embodiment, the present disclosure is not limited thereto. For example, as illustrated in FIG. 7, the wall part may include fifth wall part 5 and sixth wall part 6.

Fifth wall part 5 includes first extending part 51, and second extending part 52. First extending part 51 is extended in the lateral direction, and disposed above winding part 2. Second extending part 52 is extended downward from the right end portion of first extending part 51 and disposed on the right side of winding part 2. First extending part 51 corresponds to the "first wall part" of the present disclosure. Second extending part 52 corresponds to the "third wall part" of the present disclosure.

As with fifth wall part 5, sixth wall part 6 includes first extending part 61 and second extending part 62. First extending part 61 is extended in the lateral direction, and disposed below winding part 2. Second extending part 62 is extended upward from the left end portion of first extending part 61 and disposed on the left side of winding part 2. First extending part 61 corresponds to the "second wall part" of the present disclosure. Second extending part 62 corresponds to the "fourth wall part" of the present disclosure. That is, in the above embodiment, the combination of first wall part 31 and third wall part 33, and the combination of second wall part 32 and fourth wall part 34 may each be integrally configured in an L-shape. By forming the core in an L-shape, the increase of the heat generation amount and the increase of the loss due to the stress applied thereto can be reduced.

Specifically, second extending part 52 of fifth wall part 5 makes contact with the upper surface of the right end portion of first extending part 61 of sixth wall part 6. Second extending part 62 of sixth wall part 6 makes contact with the lower surface of the left end portion of first extending part 51 of fifth wall part 5. Winding part 2 is disposed on the upper surface of first extending part 61 of sixth wall part 6. Potting material 4 is supplied in the space surrounded by fifth wall part 5 and sixth wall part 6.

With such a configuration, when a rightward stress is applied from the inside of fifth wall part 5, fifth wall part 5 slides to the right side along the direction of the stress, for example. In addition, when a leftward stress is applied from the inside of sixth wall part 6, sixth wall part 6 slides to the left side along the direction of the stress, for example.

That is, even with such a configuration, the influence of the stress can be reduced, and thus the increase of the heat generation amount and the increase of the loss due to the stress can be reduced.

Figure 8:
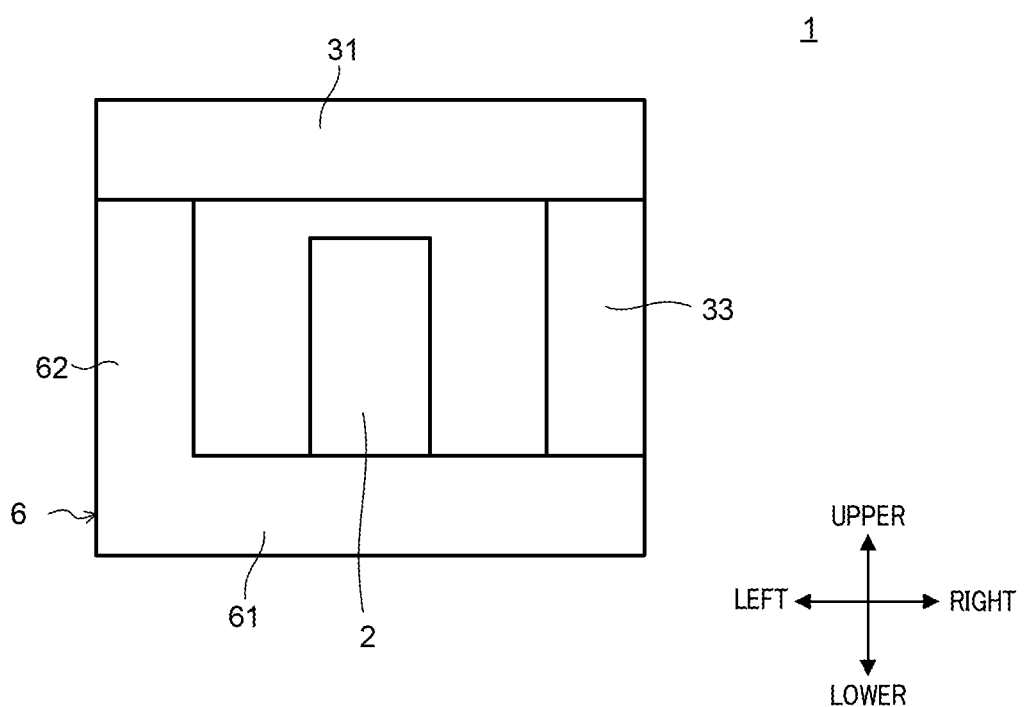
FIG. 8 is a diagram illustrating an example of a core according to a modification.

In addition, one of fifth wall part 5 and sixth wall part 6 may be included in the wall part. For example, as illustrated in FIG. 8, the wall part may include first wall part 31 and third wall part 33 of the configuration illustrated in FIG. 1 and the like, and sixth wall part 6 illustrated in FIG. 6. That is, in the above embodiment, the combination of first wall part 31 and third wall part 33, or the combination of second wall part 32 and fourth wall part 34 may be integrally configured in an L-shape. FIG. 8 illustrates a core in which second wall part 32 and fourth wall part 34 are integrated with each other.

However, since fifth wall part 5 or sixth wall part 6 has the configuration in which the first extending part and the second extending part are connected to each other, a stress may be applied to each other between the first extending part and the second extending part. As such, if possible, it is preferable to adopt the configuration in which the wall part is divided into each side as in the configuration illustrated in FIG. 1 or the like.

In addition, at least one of first wall part 31, second wall part 32, third wall part 33 and fourth wall part 34 may be further divided into a plurality parts. In this case, the plurality of divided parts of first wall part 31, second wall part 32, third wall part 33 and fourth wall part 34 may not have a linear shape.

Figure 9:
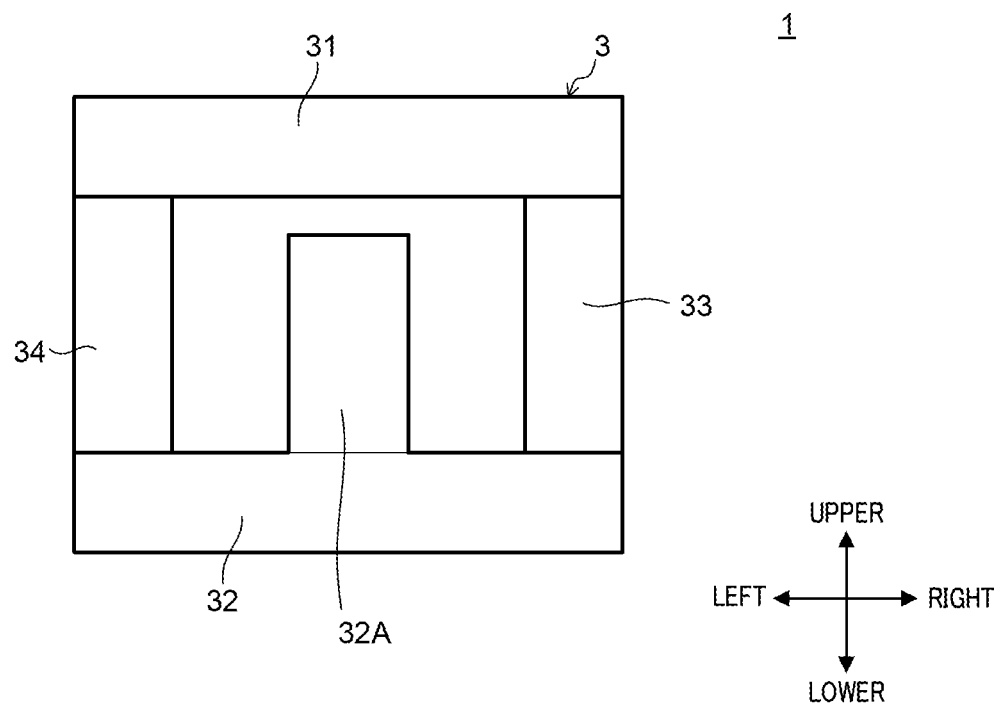
FIG. 9 is a diagram illustrating an example of a core according to a modification.

In addition, while winding part 2 and wall part 3 are composed of respective separate members in the above embodiment, the present disclosure is not limited thereto. For example, as illustrated in FIG. 9, the winding part and the wall part may be integrated with each other.

In this configuration, second wall part 32 of wall part 3 includes winding part 32A. Winding part 32A extends upward from a central portion in the lateral direction in the upper surface of second wall part 32. The upper end portion of winding part 32A is spaced apart from first wall part 31.

Even with such a configuration, the influence of the stress can be reduced, and thus the increase of the heat generation amount and the increase of the loss due to the stress can be reduced.

Incidentally, since winding part 32A is integrated with second wall part 32 in this configuration, the stress resulting from expansion of potting material 4 is applied also to winding part 32A. As such, it is preferable to adopt a configuration that can release the stress applied to the entire core 1 in the range sandwiched between winding part 32A, third wall part 33 and fourth wall part 34 as much as possible.

Specifically, it is preferable that the contact points between second wall part 32, third wall part 33 and fourth wall part 34 be located within the range of winding part 32A in the vertical direction, and it is more preferable that the contact points are located at the same position as the base end portion of winding part 32A in the vertical direction. The base end portion of winding part 32A in the configuration illustrated in FIG. 9 is the lower end portion of winding part 32A, and is located at the same position as the contact points of second wall part 32, third wall part 33 and fourth wall part 34 in the vertical direction.

As a result, third wall part 33 and fourth wall part 34 are movable in the range between winding part 32A, third wall part 33 and fourth wall part 34, and thus the stress is easily relieved.

Figure 10:
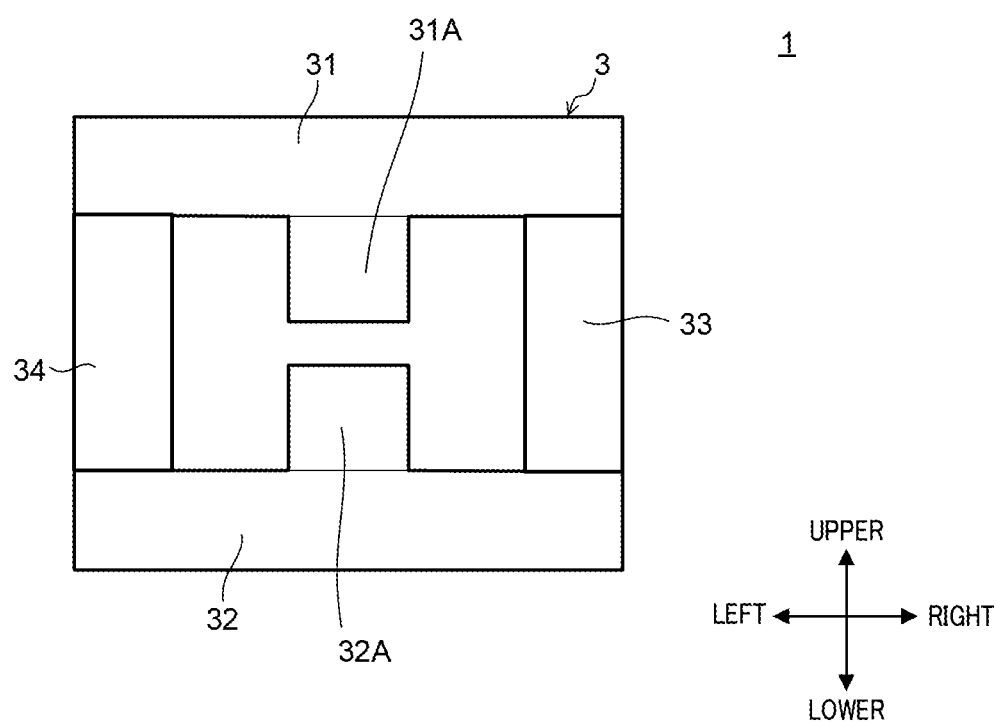
FIG. 10 is a diagram illustrating an example of a core according to a modification.

In addition, as illustrated in FIG. 10, first wall part 31 may include winding part 31A. In this configuration, first wall part 31 includes winding part 31A, and second wall part 32 includes winding part 32A. Winding part 31A extends downward from the lower surface of first wall part 31, and faces winding part 32A of second wall part 32. Winding part 32A of second wall part 32 is shorter in comparison with the configuration illustrated in FIG. 9.

Figure 11:
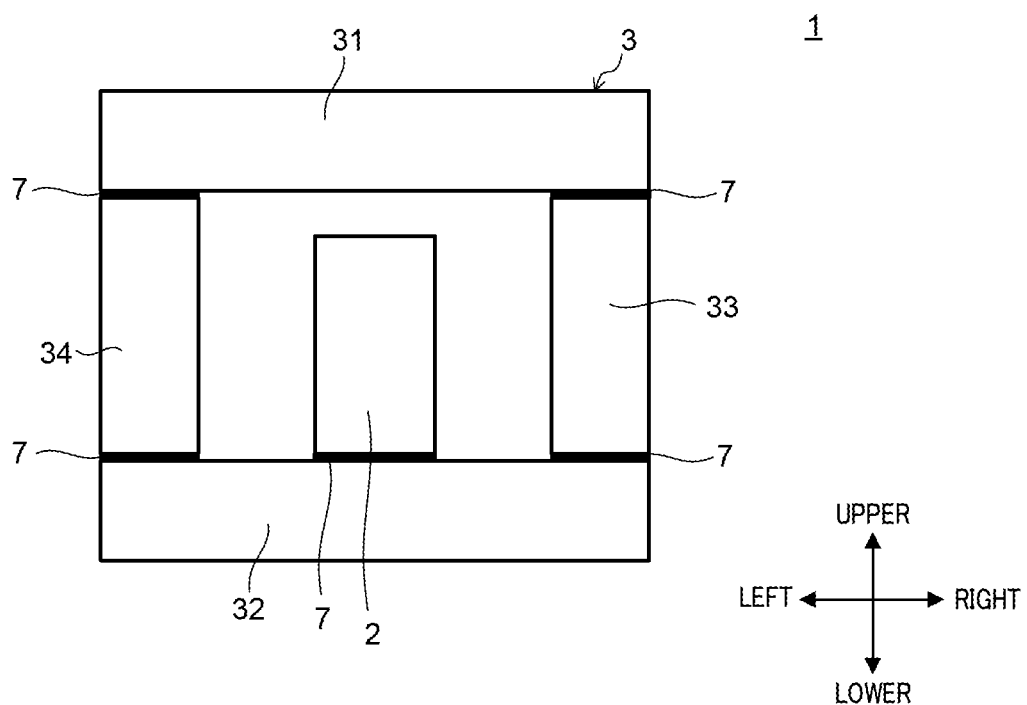
FIG. 11 is a diagram illustrating an example of a core according to a modification.

In addition, while the winding part and the wall part are fixed with the potting material in the above embodiment, the present disclosure is not limited to this. For example, as illustrated in FIG. 11, the contact points between each part may be fixed with adhesive 7 such that the parts are fixed.

Note that adhesive 7 is required to have a melting point (softening point) at which adhesive 7 is softened and the fixed state is released when core 1 generates heat during the operation of the apparatus. Otherwise, when wall part 3 is thermally expanded due to the stress applied to each part, each part cannot be moved, and consequently the increase of the heat generation amount and the increase of the loss due to the stress cannot be reduced.

In addition, in the case where the apparatus in which the transformer is mounted does not need to fix the core with a potting material, an adhesive, or the like, each part of the wall part may be fixed with a fixing member such as a clip. However, it is necessary that the fixing member has a fixing force that allows for movement of each part when the wall part is thermally expanded.

In addition, while wall part 3 has a rectangular shape in the above embodiment, the present disclosure is not limited thereto, and may have a shape other than a rectangular shape.

In addition, any of the above-described embodiments is merely an example of a specific embodiment for implementing the present disclosure, and the technical scope of the present disclosure should not be construed as being limited by these embodiments. That is, the present disclosure may be embodied in various forms without departing from the spirit or essential characteristics thereof.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2019-115485, filed on Jun. 21, 2019, the disclosure of which including the specification, drawings and abstract is incorporated herein by reference in its entirety.

INDUSTRIAL APPLICABILITY

The core of the present disclosure is useful as a core that can reduce the increase of the heat generation amount and the increase of the loss due to a stress applied to the core.

The invention claimed is:

1. A core comprising:
   a winding part where a winding is wound; and
   a wall part including a first wall part, a second wall part spaced apart from the first wall part and disposed opposite to the first wall part in a first direction, a third wall part in contact with the first wall part, and a fourth wall part spaced apart from the third wall part and disposed opposite to the third wall part in a second direction different from the first direction, the wall part surrounding the winding part,
   wherein:
     the winding part is spaced apart from the first wall part, the third wall part and the fourth wall part, and is included in the second wall part,
     the first wall part, the second wall part, the third wall part, and the fourth wall part are separate from each other,
     the winding part extends in the first direction between a contact point between the second wall part and the third wall part, and a contact point between the second wall part and the fourth wall part,
     a distance between an external cooling part and the first wall part is greater than a distance between the external cooling part and the second wall part,
     a space between the winding part and the first wall part is closer to the first wall part than to the second wall part in the first direction; and
     the winding part is spaced apart from the first wall part, the third wall part and the fourth wall part, and is unitary with the second wall part.

2. The core according to claim 1, wherein the first wall part, the second wall part, the third wall part, and the fourth wall part are configured to be movable with thermal expansion of the wall part.

3. The core according to claim 1, wherein
   the third wall part is configured to be movable with respect to the first wall part and the second wall part; and
   the fourth wall part is configured to be movable with respect to the first wall part and the second wall part.

4. The core according to claim 1, wherein
   the second wall part is configured to be movable with respect to the third wall part and the fourth wall part.

5. The core according to claim 2, wherein
   the third wall part is configured to be movable with respect to the first wall part and the second wall part; and
   the fourth wall part is configured to be movable with respect to the first wall part and the second wall part.

6. The core according to claim 1, wherein
   the second wall part contacts the external cooling part.

7. The core according to claim 4, wherein
   the second wall part contacts the external cooling part.

* * * * *